(12) United States Patent
Iwasaki et al.

(10) Patent No.: US 9,769,403 B2
(45) Date of Patent: Sep. 19, 2017

(54) IMAGING DEVICE, IMAGE PROCESSING DEVICE, AND IMAGING METHOD

(71) Applicant: Olympus Corporation, Shibuya-ku, Tokyo (JP)

(72) Inventors: Hiroaki Iwasaki, Niiza (JP); Ryo Hatakeyama, Hino (JP)

(73) Assignee: Olympus Corporation, Tokyo (JP)

( * ) Notice: Subject to any disclaimer, the term of this patent is extended or adjusted under 35 U.S.C. 154(b) by 24 days.

(21) Appl. No.: 14/960,911

(22) Filed: Dec. 7, 2015

(65) Prior Publication Data

US 2016/0182840 A1    Jun. 23, 2016

(30) Foreign Application Priority Data

Dec. 17, 2014    (JP) ................................. 2014-255327

(51) Int. Cl.
  *H04N 5/365*    (2011.01)
  *H04N 5/361*    (2011.01)
  *H04N 5/217*    (2011.01)

(52) U.S. Cl.
  CPC ........... *H04N 5/365* (2013.01); *H04N 5/2173* (2013.01); *H04N 5/361* (2013.01)

(58) Field of Classification Search
  CPC ....... H04N 5/365; H04N 5/2173; H04N 5/361
  See application file for complete search history.

(56) References Cited

U.S. PATENT DOCUMENTS

2006/0082675 A1\* 4/2006 McGarvey ........... H04N 3/1568
                                                    348/362

FOREIGN PATENT DOCUMENTS

JP    2000-261715    9/2000
JP    2005-117395    4/2005

\* cited by examiner

*Primary Examiner* — Twyler Haskins
*Assistant Examiner* — Angel L Garces-Rivera
(74) *Attorney, Agent, or Firm* — John C. Pokotylo; Pokotylo Patent Services

(57) ABSTRACT

An imaging device, comprising a dark image data imaging section for acquiring first dark image data acquired by shooting in a state where a light beam incident on the imaging surface of the image sensor is shielded, before acquiring first image data that has been read out from the image sensor, and second dark image data acquired by shooting in a state where a light beam incident on the imaging surface of the image sensor is shielded after the second image data that was finally acquired, a corrected image data generating section for generating dark corrected image data by carrying out combination processing based on a comparison result of comparing the first and second dark image data, or an averaging computation result, and a correction section for correcting fixed pattern noise within the cumulatively combined image data using the dark corrected image data.

14 Claims, 8 Drawing Sheets

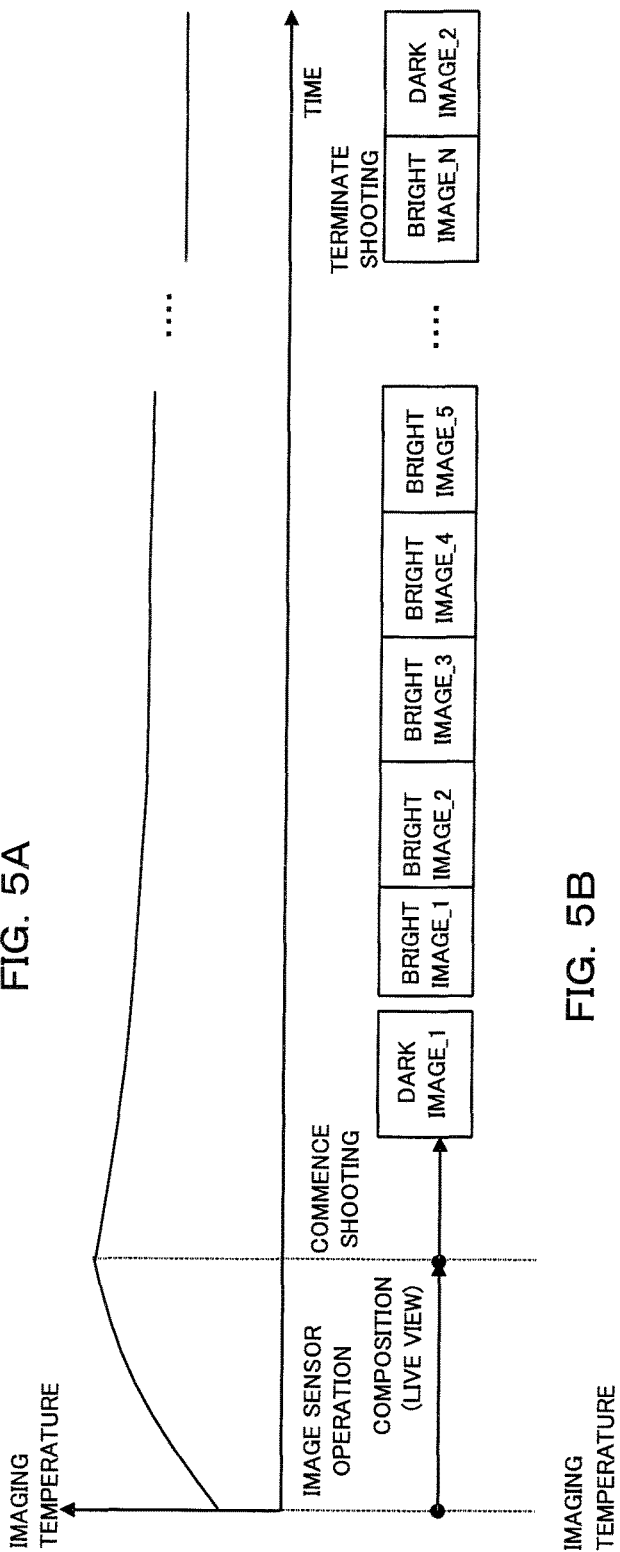
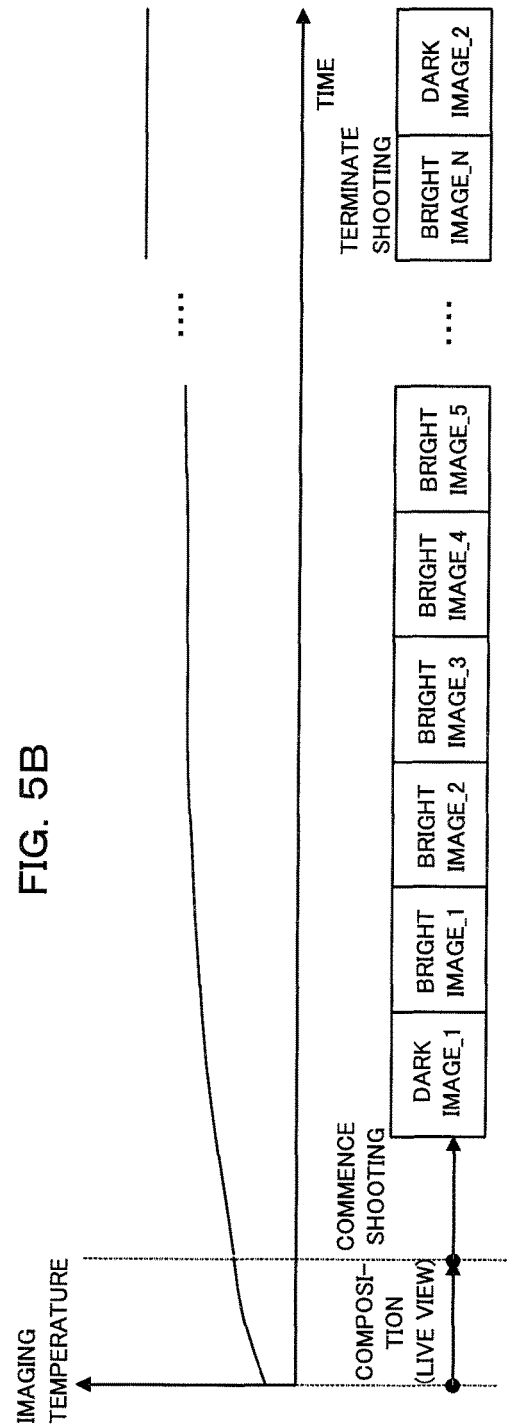

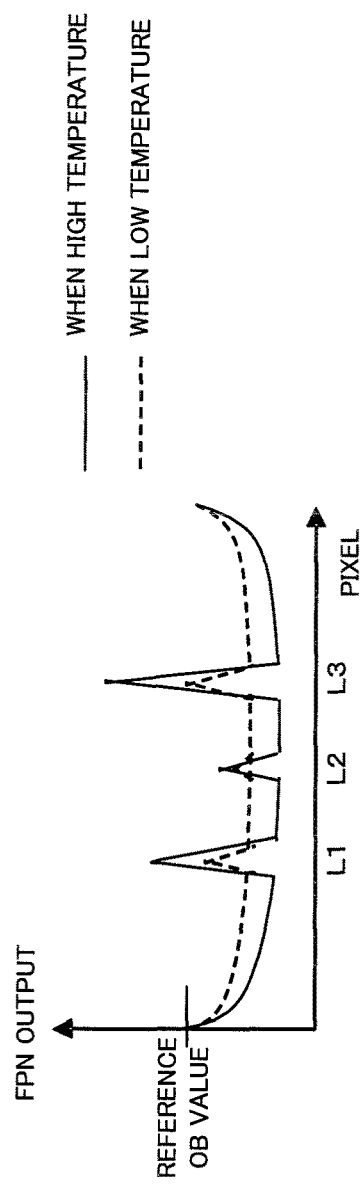
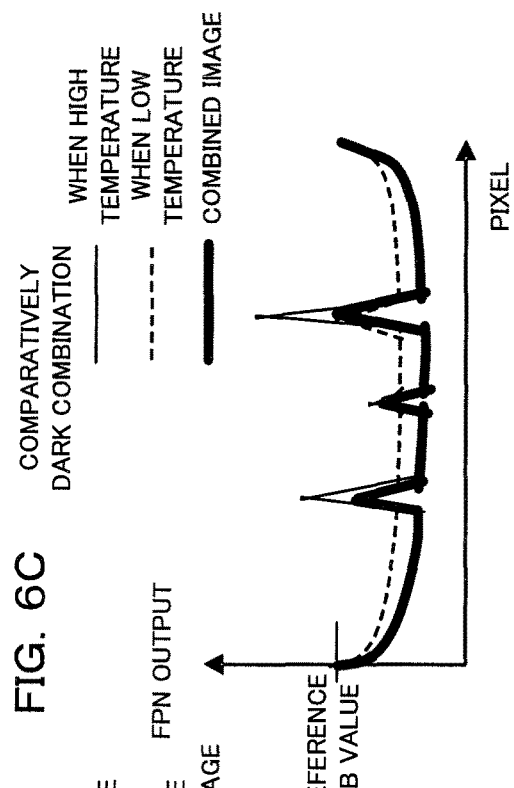
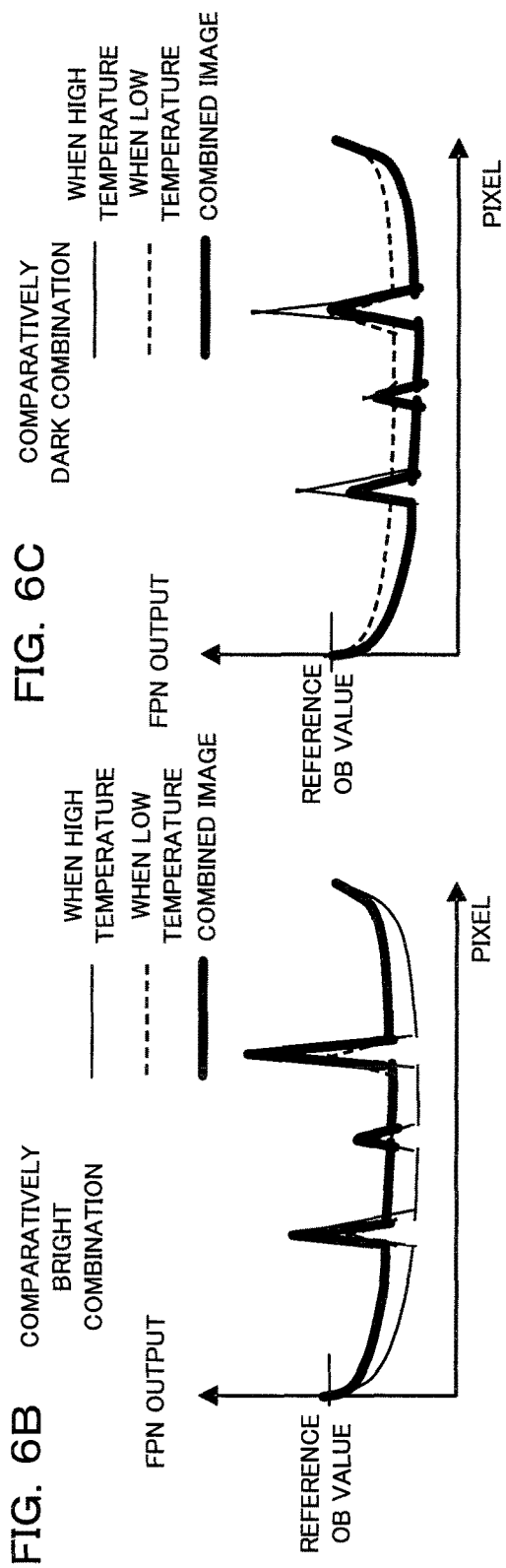

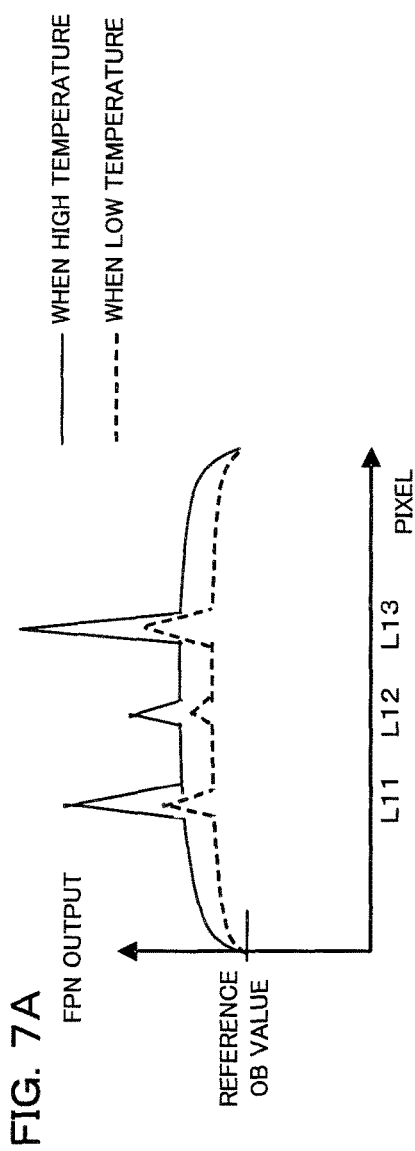
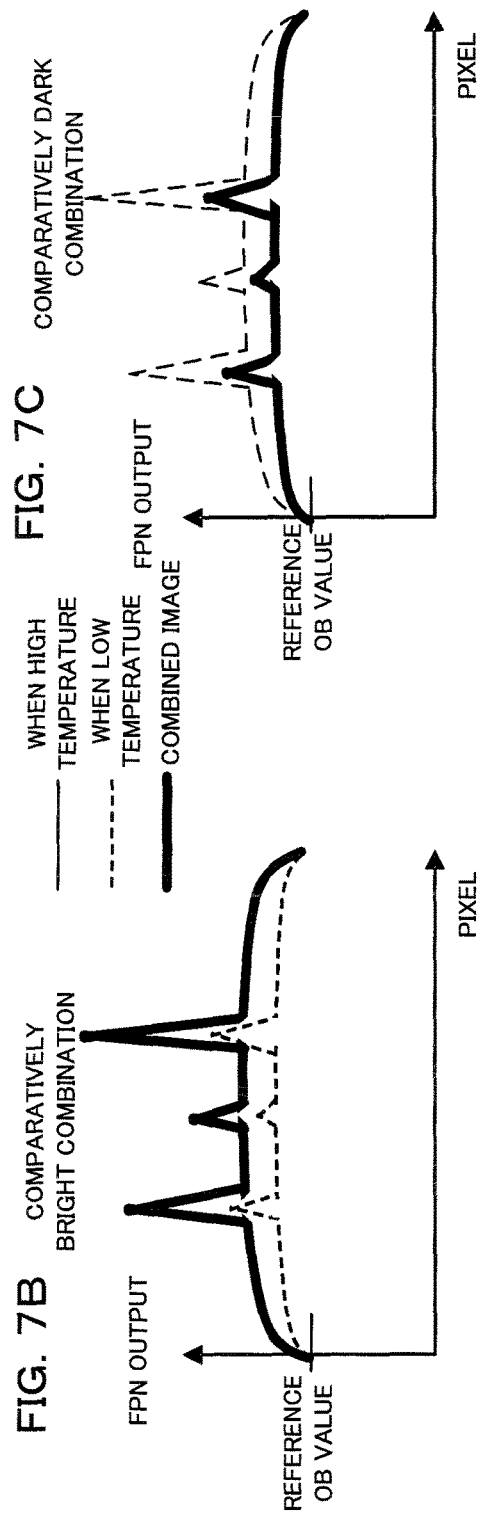

FIG. 8A  PRIOR ART  DARK SHADING

FIG. 8B  PRIOR ART  PIXEL DEFECT

IMAGING DEVICE, IMAGE PROCESSING DEVICE, AND IMAGING METHOD

Benefit is claimed, under 35 U.S.C. §119, to the filing date of prior Japanese Patent Application No. 2014-255327 filed on Dec. 17, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device, an image processing device, and an imaging method for eliminating the effects of a fixed pattern noise of an image sensor when carrying out shooting a plurality of times from commencement of shooting until completion, and combining a plurality of acquired image data.

2. Description of the Related Art

Conventionally, with a single lens reflex type imaging device, observing a subject image has been performed using an optical viewfinder. However, imaging devices for observing a subject image not through an optical viewfinder but by live view display for displaying an image that has been read from an image sensor using a liquid crystal monitor or the like are known. Also, instead of an optical viewfinder, imaging devices that display an image, using live view display, using an electronic viewfinder that is separate from a liquid crystal monitor, and are capable of switching between the liquid crystal monitor and the electronic viewfinder, are available on the market.

It was not conventionally possible to perform readout of image signals from an image sensor during exposure, at the time of a prolonged exposure such as bulb shooting, with either an optical viewfinder or an electronic viewfinder. This meant that the photographer was not able to confirm subject state or exposure state, and confirmation of an image was carried out after completion of shooting. As a result, exposure setting and exposure time were estimated by the photographer taking the photograph from brightness of the subject etc. to determine starts and completion of exposure, and it was not a simple matter for the photographer to acquire a desired taken image without shooting failures due to under exposure or overexposure.

Imaging devices have therefore been proposed for reading out an image signal from an image sensor at specified time intervals, and displaying images obtained by simple accumulative addition every time this image signal is read out from the image sensor on a liquid crystal monitor. For example, according to the imaging device disclosed in Japanese patent laid open number 2005-117395, it is possible to reduce failures of shooting by displaying current progress of an exposure at the time of long exposure shooting such as bulb shooting. Also, an imaging device for generating a bulb shooting image by reading out an image signal continuously from an image sensor and carrying out comparatively bright combination (combining means for comparing brightness levels for every pixel of image data, selecting brighter pixels to be reflected in a resulting combination) is proposed in Japanese patent number 4148586.

With bulb shooting, shooting is carried out using exposure for a long time spanning from a few seconds to a few minutes. As a characteristic of the image sensor, dark current components occur in photodiodes constituting pixels of the image sensor at the time of long time exposure, giving rise to fixed pattern noise. The extent to which dark current arises varies for every pixel, and increases in proportion to exposure time. There is also a characteristic that current increases as image sensor temperature rises, and appears in an image as defect noise or image density irregularities.

This fixed pattern noise due to dark current is only dependent on image sensor temperature at the time of exposure, and exposure time, irrespective of whether shooting in an exposed state or shooting in a light shielded state. With digital cameras that are currently on the market, therefore, at the time of bulb shooting after the user has taken a picture (taken image is made a bright image) a light shielding image is automatically taken at the same shutter speed, and FPN (Fixed Pattern Noise) cancellation processing to correct the fixed pattern noise is carried out by carrying out subtraction processing for the bright image data and the light shielded image data, in an image processing circuit after the image sensor.

With an imaging device described in the above-described related literature, a dark image is taken after the bright image has been taken. Dark current, which is a cause of fixed pattern noise, increases as temperature of the image sensor increases. This means that if image sensor temperature is reduced during shooting, it will not be possible to sufficiently correct fixed pattern noise with a dark image that has been acquired after bright image shooting. It is therefore being considered to shoot dark images before and after bright image shooting, and monitor the temperature of the image sensor at the time of shooting the respective dark images, and to perform correction by selecting a dark image that was acquired when temperature was high to select an image that is suitable for FPN cancellation.

However, depending on the image sensor, variations within the imaging area, namely, FPN (fixed pattern noise) caused by dark current (dark current shading), become smaller as temperature increases. Dark current shading arises because in a process of creating photodiodes (PD) that constitute pixels of the image sensor, it is not possible to create PD having uniform characteristics at the center and the periphery of the sensor, and because there is inconsistency in the extent to which dark current arises at the center portions and at the periphery.

Dark current itself, being the FPN, becomes larger as temperature of the center and the periphery of the image sensor increases. Generally, with the image sensor 50, as shown in FIG. 8C, in addition to an effective pixel region 51 for acquiring image output as a result of receiving incident light of an optical image on the image sensor, OB (Optical Black) pixel regions (horizontal OB pixels 53 and vertical OB pixels 54) that are in a physically light shielded state, are arranged at the periphery of the effective pixel region. Output signals of the OB pixel regions are detected as a representative value of dark current output of the image sensor effective pixels (reference OB output).

However, it is common practice for read out signals to be subjected to OB black processing with average output of OB pixels that are arranged at the periphery of the sensor as a reference OB output for dark output, in a sensor internal circuit or a DSP (digital signal processor) disposed after the sensor. For this reason, with a general image sensor 50, namely an image sensor 50 having dark current shading where dark current at the periphery becomes larger than at the center, as shown in FIG. 8A, in-plane variations arise such that output of a dark image at the center of the sensor becomes smaller as temperature increases.

On the other hand, for pixel defects, since there is a tendency for pixel defects to increase as temperature increases, as shown in FIG. 8B, defective pixels can be corrected to a certain extent of brightness even if a dark image for a higher temperature is used, in accordance with results of temperature detection before commencement and upon completion of shooting. However, for correction of in-plane variations using this method (dark color and shading), it is not possible to optimally correct the in-plane variations (dark current shading).

SUMMARY OF THE INVENTION

An object of the present invention is to provide an imaging device, an image processing device and an imaging method, for carrying out FPN correction by applying reliable and accurate correction information to a plurality of image data that have been acquired by shooting a plurality of times, and preventing image degradation such as brightness variation.

An imaging device of the present invention, that stores first image data that has been initially formed based on image data that has been read out from an image sensor, as cumulatively combined image data in a first memory, followed by operations of an image processing section carrying out combination processing to reconstruct the cumulatively combined image data pixel data by making pixel data, that is based on a comparison result of comparing a plurality of pixel data constituting second image data that has been generated based on image data that has been read out from the image sensor with pixel data respectively corresponding to a plurality of pixel data constituting the cumulatively combined image data, and/or an averaging computation result, new pixel data, and then the first memory sequentially repeating operations on the second image data of second and subsequent frames that have been generated based on image data that has been read out from the image sensor by storing the cumulatively combined image data after the reconstruction, comprises: a shutter that places a light beam that is incident on an imaging surface of the image sensor in an exposed state or a light shielded state, a controller including an image sensor control section, a shutter control section, and a dark image data imaging section, (1) the image sensor control section for carrying out control to cause operation to read out image data from the image sensor, (2) the shutter control section for controlling to cause operation to place the shutter in an exposing state or a light shielding state, (3) the dark image data imaging section for acquiring first dark image data before acquiring the first image data by placing the shutter in a light shielding state for a light beam that is incident on the imaging surface of the image sensor, and causing a shooting operation of the image sensor in the light shielding state, and acquiring second dark image data by, after the second image data has been finally acquired, placing the shutter in a light shielding state for the light beam that is incident on the imaging surface of the image sensor, and causing a shooting operation of the image sensor in the light shielding state, a corrected image data generating section for generating dark corrected image data by carrying out combination processing based on a comparison result of comparing the first and second dark image data, or an averaging computation result, and a correction section for correcting fixed pattern noise within the cumulatively combined image data using the dark corrected image data.

An image processing device of the present invention, for generating cumulatively combined image data by carrying out image combination processing using first and second dark image data that have been read out from an image sensor in a light shielding state before and after imaging by an imaging device, and a plurality of image data that have been repeatedly read out during shooting by the imaging device, comprises a first memory for storing first image data that has initially been generated based on image data that has been read out from the image sensor, among the plurality of image data, as cumulatively combined image data, an image combination processing section for sequentially repeating combination processing to reconstruct the cumulatively combined image data by making pixel data, that has been subjected to combination processing based on a comparison result of comparing a plurality of pixel data constituting second image data that has been generated based on image data that has been read out from the image sensor with pixel data respectively corresponding to a plurality of pixel data constituting the cumulatively combined image data, and/or an averaging computation result, new pixel data, for the second image data of second and subsequent frames that have been generated based on image data that has been read out from the image sensor, a corrected image data generating section for generating dark corrected image data by carrying out combination processing based on a comparison result of comparing the first and second dark image data, or an averaging computation result, and a correction section for correcting fixed pattern noise within the cumulatively combined image data using the dark corrected image data.

An imaging method of the present invention, for an imaging device that stores first image data, that has been initially formed based on image data that has been read out from an image sensor, as cumulatively combined image data, followed by sequentially repeating combination processing to reconstruct the cumulatively combined image data pixel data by making pixel data, that has been subjected to combination processing based on a comparison result of comparing a plurality of pixel data constituting second image data that has been generated based on image data that has been read out from the image sensor with pixel data respectively corresponding to a plurality of pixel data constituting the cumulatively combined image data, and/or an averaging computation result, new pixel data, for the second image data of second and subsequent frames that have been generated based on image data that has been read out from the image sensor, comprises: a dark image data step of acquiring first dark image data, before acquiring the first image data, acquired by shooting in a state where a light beam incident on the imaging surface of the image sensor is shielded, and second dark image data acquired in a state where a light beam incident on the imaging surface of the image sensor is shielded after the second image data that was finally acquired, a corrected image data generating step of generating dark corrected image data by carrying out combination processing based on a comparison result of comparing the first and second dark image data, or an averaging computation result, and a correction step for correcting fixed pattern noise within the cumulatively combined image data using the dark corrected image data.

BRIEF DESCRIPTION OF THE DRAWINGS

FIG. 5A and FIG. 5B are graphs showing temperature change when shooting in combination mode, with the camera of one embodiment of the present invention.

FIG. 6A to FIG. 6C are graphs showing change in both pixel default characteristic and dark shading characteristic when tendencies of the two characteristics are different, with the camera of one embodiment of the present invention.

FIG. 7A to FIG. 7C are graphs showing temperature change for both pixel default characteristic and dark shading characteristic when inclinations of the two characteristics are different, with the camera of one embodiment of the present invention.

FIG. 8A to FIG. 8C are drawings for describing temperature characteristic change and pixel arrangement of a sensor, with a conventional camera, with FIG. 8A being a graph showing temperature change of a pixel defect characteristic, FIG. 8B being a graph showing temperature change of a dark shading characteristic, and FIG. 8C being a plan view showing pixel arrangement of an image sensor.

DETAILED DESCRIPTION OF THE PREFERRED EMBODIMENTS

Preferred embodiments using a camera to which the present invention has been applied will be described in the following. A camera of a preferred embodiment of the present invention is a digital camera, and, in summary, subjects image data to live view display on a display section on the basis of image data read out from an image sensor, and also stores image data that has been subjected to image processing for storage in external memory in response to operation of a release button. Also, FPN correction is carried out by deducting a dark image that has been acquired in a state where a light beam incident on the imaging surface of the image sensor is shielded from a bright image at the time of shooting. This FPN correction is carried out using an image resulting from combining dark images for two frames that were acquired before and after acquiring the bright image.

Specifically, with this embodiment, when generating a bulb shooting image by comparative combination of image signals that have been continuously read out from the image sensor, when carrying out comparatively bright combination (comparing brightness levels for every pixel of image data and selecting the brightest pixel and making that the brightness level after combination) as combination processing FPN cancellation is carried out using dark images of two frames that have been taken before and after shooting a bright image. Also, in a case of carrying out comparatively dark combination (combination to compare brightness levels for every pixel of image data, selecting the least bright pixel and making this the brightness level after combination) as the combination processing, FPN cancellation is carried out using an image that results from comparatively dark combination of dark images for two frames taken before and after shooting a bright image. Also, when carrying out averaging combination (combination to average output for every pixel) as the combination processing, FPN cancellation is carried out using an image resulting from averaging dark images for two frames taken before and after shooting of the bright image (refer, for example, to S39-S47 in FIG. 3).

Using this FPN cancellation, fixed pattern noise of a combined image is corrected with good precision, and image quality is improved. For an image that is in the process of being combined also, using a dark image that has been taken before shooting of a bright image, FPN cancellation is carried out, and image quality of live view display and an interim stored image are also improved (refer, for example, to S25 in FIG. 2).

Figure 1:
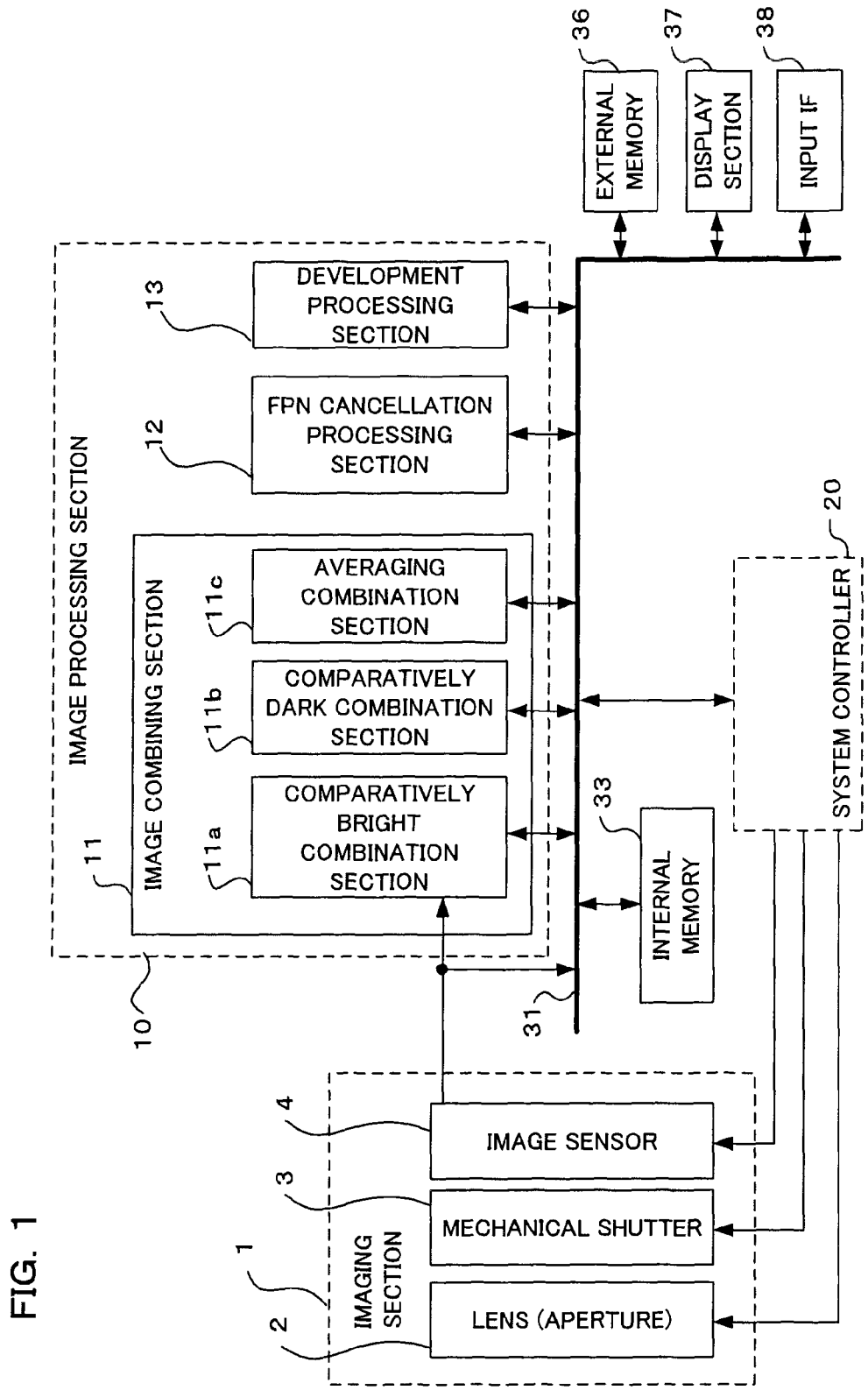
FIG. 1 is a block diagram mainly showing the electrical structure of a camera of one embodiment of the present invention.

FIG. 1 is a block diagram mainly showing the electrical structure of a camera of one embodiment, as a preferred embodiment of the present invention. The camera of this embodiment comprises an imaging section 1, an image processing section 10, system controller 20 and a bus 31, with each section being connected to this bus. With this embodiment, the lens 2 is formed integrally with the camera body, but it may also be an interchangeable lens.

A lens 2, mechanical shutter 3 and image sensor 4 are arranged inside the imaging section 1. The lens 2 forms an optical image of the subject on the image sensor 4. An aperture for determining aperture value in order to adjust exposure amount is provided inside this lens 2. Also, a mechanical shutter 3 exposes or shields light to the image sensor 4 by an opening and closing operation, and controls shutter speed. The image sensor 1 is light-shielded by closing the mechanical shutter 4. Image data that has been acquired in this state is called dark image data. A light shielding state is entered twice, before commencing shooting and after completion of shooting, and of these two times image data that has been acquired in the light shielding state before commencement of shooting is called dark image data_1 (referred to S9 in FIG. 2), while the image data that has been acquired in the light shielding state after completion of shooting is called dark image data_2 (refer to S37 in FIG. 3).

The image sensor 4 includes an image sensor such as a CMOS image sensor or a CCD image sensor, and converts an optical image of a subject that has been formed by the lens 2 into electrical signals for every pixel, before outputting image data to the image processing section 10 and the bus 31. The bus 31 is a signal line for exchanging signals between each block. Before acquiring first image data (the first image data is image data that has been initially generated based on data that has been read out from the image sensor) and after second image data that has been finally acquired (the second image data is image data that has been generated based on image data that has been read out from the image sensor, after the first image data has been generated), the mechanical shutter 3 and the image sensor 4 function as a dark image data imaging section for acquiring dark image data in a state where a light beam that is incident on the imaging surface of the image sensor is shielded.

The image processing section 10 applies image processing to image data that has been output from the image sensor 4. This image processing section 10 comprises an image combination section 11, FPN cancellation processing section 12, and a development processing section 13.

The image combination section 11 comprises a comparatively bright combination section 11a, a comparatively dark combination section 11b and an averaging combination section 11c, and performs comparison or averaging for every respectively corresponding pixel within images that have been continuously read out from the image sensor 4 or image data that has been saved in the internal memory 33, to generate a combined image using comparatively bright combination processing, comparatively dark combination processing or averaging combination processing.

Also, the image combination section 11 generates the same combined image using dark image data for two frames that has been acquired before acquiring the first image data and after the finally acquired second image data has been acquired (dark image data_1 and dark image data_2). Specifically, the image combination section 11 functions as a corrected image data generating section for generating dark corrected image data by carrying out combination processing based on a comparison result of comparing the first and second dark image data, or an averaging computation result (refer to S41-S45 in FIG. 3).

The comparatively bright combination section 11a carries out comparatively bright combination processing, as described below. Pixel data constituting image data that has been generated based on image data initially read out from the image sensor 4 is stored in the internal memory 33 as cumulative comparatively bright combination image data. Next, if image data has been read out from the image sensor 4, the comparatively bright combination section 11a compares pixel data respectively corresponding to pixel data constituting image data that has been generated based on the image data that has been read out, and a plurality of pixel data constituting cumulative comparatively bright combination image data stored in the internal memory 33. Then, in accordance with the result of comparing the respectively corresponding pixel data, the larger, namely brighter, pixel data is detected, and cumulative comparatively bright combination image data is reconstituted using this brighter pixel data. This processing is repeatedly carried out every time image data is read out from the image sensor. For example, if comparatively bright combination processing is carried out in the case of shooting a photograph of astral bodies, it is possible to acquire an image of star trails in the night sky.

Also, the comparatively bright combination section 11a similarly generates comparatively bright combination image data for dark image data of two frames that have been acquired before acquiring the first image data and after the second image data has been finally acquired, and uses this in FPN cancellation which will be described later (refer, for example, to S41 in FIG. 3).

The comparatively dark combination section 11b carries out comparatively dark combination processing as described in the following. Pixel data constituting image data that has been generated based on image data initially read out from the image sensor 4 is stored in the internal memory 33 as cumulative comparatively dark combination image data. Next, if image data has been read out from the image sensor 4, the comparatively dark combination section 11b compares pixel data respectively corresponding to pixel data constituting image data that has been generated based on the image data that has been read out, and a plurality of pixel data constituting cumulative comparatively dark combination image data stored in the internal memory 33. Then, using the result of comparing the respectively corresponding pixel data, the smaller, namely darker, pixel data is detected, and cumulative comparatively dark combination image data is reconstituted using this darker pixel data. If comparatively dark combination processing is carried out in the case of shooting a photograph of astral bodies, it is possible to acquire an image of the background, with star trails in the night sky removed.

Also, the comparatively dark combination section 11b similarly generates comparatively dark combination image data for dark image data of two frames that have been acquired before acquiring the first image data and after the second image data has been finally acquired, and uses this in FPN cancellation which will be described later (refer, for example, to S43 in FIG. 3).

The averaging combination section 11c carries out combination processing, as described in the following. Pixel data constituting image data that has been generated based on image data initially read out from the image sensor 4 is stored in the internal memory 33 as cumulative averaging combination image data. Next, if image data has been read out from the image sensor 4, the averaging combination section 11c combines (averages) pixel data respectively corresponding to pixel data constituting image data that has been generated based on the image data that has been read out, and a plurality of pixel data constituting cumulative averaging combination image data stored in the internal memory 33. The cumulative averaging combination image data is then reconstituted using pixel data resulting from averaging the respectively corresponding pixel data. For example, if averaging combination processing is carried out in the case of shooting astral bodies, it is possible to acquire a high quality image with low noise, with random noise alleviated by averaging.

Also, the averaging combination section 11c similarly generates averaging combination image data for dark image data of two frames that have been acquired before acquiring the first image data and after the second image data has been finally acquired, and uses this in FPN cancellation which will be described later (refer, for example, to S45 in FIG. 3).

The FPN cancellation processing section 12 carries out subtraction processing for output for every pixel data of a bright image (image taken when mechanical shutter 3 is open) and a dark image (image taken when mechanical shutter 3 is closed, for acquiring dark image data), and corrects fixed pattern noise. The FPN cancellation processing section 12 functions as a correction section for correcting fixed pattern noise within cumulatively combined image data using dark corrected image data (refer, for example, to S47 in FIG. 3).

The FPN cancellation processing section 12 functions as a correction section for correcting fixed pattern noise within cumulative comparatively bright combination image data using dark image data. This correction section corrects fixed pattern noise within cumulative comparatively bright combination image data using image data resulting from comparatively bright combination of dark image data that has been acquired before acquisition of the first image data, and dark image data that has been acquired after the second image data has been finally acquired.

The FPN cancellation processing section 12 functions as a correction section for correcting fixed pattern noise within cumulative comparatively dark combination image data using dark image data. This correction section corrects fixed pattern noise within cumulative comparatively dark combination image data using image data resulting from comparatively dark combination of dark image data that has been acquired before acquisition of the first image data, and dark image data that has been acquired after the second image data has been finally acquired.

The FPN cancellation processing section 12 functions as a correction section for correcting fixed pattern noise within cumulative averaging combination image data using dark image data. This correction section corrects fixed pattern noise within cumulative averaging combination image data using image data resulting from averaging combination of dark image data that has been acquired before acquisition of the first image data, and dark image data that has been acquired after the second image data has been finally acquired.

The development processing section 13 carries out development processing such as demosaicing, white balance adjustment, gamma correction and image compression on RAW image data that has been generated by the image combination section 11.

Besides the previously described image processing section 10, the internal memory 33, external memory 36, display section 37, input IF (interface) 38 and system controller 20 are connected to bus 31.

The internal memory 33 temporarily stores various setting information required in camera operation, and interim image data at the time of image processing (including cumulatively combined image data). The internal memory 33 is constituted by a nonvolatile memory such as flash memory or DRAM, or volatile memory, and functions as a first memory.

The external memory 36 is a non-volatile storage medium that can be removed from the camera body or is fixed inside the camera, such as, for example an SD card or a CF card. This external memory stores image data that has been subjected to development processing by the development processing section 13, and at the time of playback it is possible to read out stored image data and output outside the camera. The external memory 36 functions as a second memory for storing cumulatively combined image data that has had fixed pattern noise corrected by the correction section.

The display section 37 has a rear surface display section such as TFT (Thin Film Transistor) liquid crystal or organic EL, or an EVF (electronic viewfinder), and displays images that have been subjected to development by the development processing section. The display section 37 functions as a display section for display output of display images.

The input IF 38 has operation members such as a release button, and a touch panel for inputting touch operations on a rear surface display section etc., and carries out various mode settings and instruction of exposure operation such as release, based on user operation. The input IF 38 functions as an operation instruction section for operation instruction of commencement and completion of shooting for the imaging device.

The system controller 20 comprises a CPU (Central Processing Unit) and its peripheral circuitry, and carries out overall control by controlling each section of the camera in accordance with programs stored in the internal memory 33.

Figure 2:
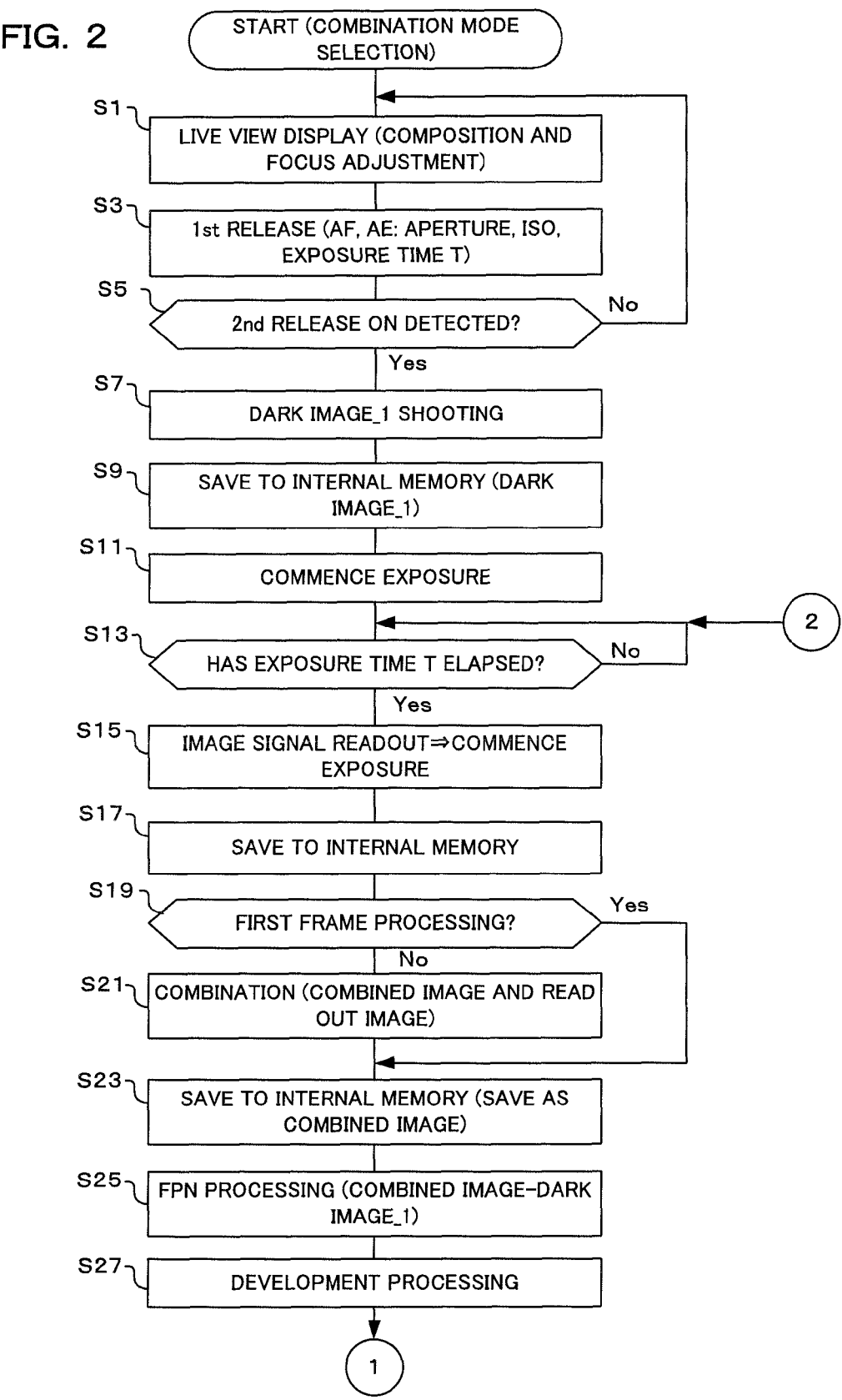
FIG. 2 is a flowchart showing operation when combination mode has been set, in the camera of one embodiment of the present invention.

Also, the system controller 20 stores first image data that has been initially generated based on image data that has been read out from the image sensor 4 in the internal memory 33 as cumulatively combined image data (refer to S17 in FIG. 2). Next, the system controller 20 causes the execution of combination processing in the image combination section 11 (S21 in FIG. 2) to reconstitute the cumulatively combined image data by making pixel data, that has been subjected to combination processing based on a comparison result of comparing respectively corresponding pixel data of a plurality of pixel data constituting second image data that has been generated based on image data that has been read out from the image sensor 4, and a plurality of pixel data constituting cumulatively combined image data, or based on an averaging computation result, new pixel data. The above described combination processing is sequentially and repeatedly carried out for the second image data of the second and subsequent frames that have been generated based on image data has been read out from the image sensor 4.

The system controller 20 also carries out overall control of the previously described comparatively bright combination processing. With this comparatively bright combination processing, first image data that has been initially generated based on image data that has been read out from the image sensor is stored in the internal memory 33 as cumulative comparatively bright combination image data. Next, the system controller 20 causes the execution of comparatively bright combination processing in the comparatively bright combination section 11a to reconstitute cumulative comparatively bright combination image data by comparing respectively corresponding pixel data of a plurality of pixel data constituting second image data that has been generated based on image data that has been read out from the image sensor 4, and a plurality of pixel data constituting cumulative comparatively bright combination image data, and making which ever is the largest pixel data new pixel data. The above described comparatively bright combination processing is sequentially and repeatedly carried out for the second image data of the second and subsequent frames that have been generated based on image data has been read out from the image sensor.

Similarly the system controller 20 also carries out overall control of the previously described comparatively dark combination processing. With this comparatively dark combination processing, first image data that has been initially generated based on image data that has been read out from the image sensor is stored in the internal memory 33 as cumulative comparatively dark combination image data. Next, the system controller 20 causes the execution of comparatively dark combination processing in the comparatively dark combination section 11b to reconstitute cumulative comparatively dark combination image data by comparing respectively corresponding pixel data of a plurality of pixel data constituting second image data that has been generated based on image data that has been read out from the image sensor 4, and a plurality of pixel data constituting cumulative comparatively dark combination image data, and making which ever pixel data is the smallest new pixel data. The above described comparatively dark combination processing is sequentially and repeatedly carried out for the second image data of the second and subsequent frames that have been generated based on image data has been read out from the image sensor.

The system controller 20 also carries out overall control of the previously described averaging combination processing. With this averaging combination processing, first image data that has been initially generated based on image data that has been read out from the image sensor is stored in the internal memory 33 as cumulative averaging combination image data. Next, the system controller 20 causes the execution of averaging combination processing in the averaging combination section 11c to reconstitute cumulative averaging combination image data by averaging respectively corresponding pixel data of a plurality of pixel data constituting second image data that has been generated based on image data that has been read out from the image sensor 4, and a plurality of pixel data constituting cumulative averaging combination image data, and making the resulting averaged data new pixel data. The above described averaging combination processing is sequentially and repeatedly carried out for the second image data of the second and subsequent frames that have been generated based on image data has been read out from the image sensor.

The system controller 20 also selects contents of combination processing carried out by the image combination section 11 (for example, the combination processing in S21 of FIG. 2). Thus, the system controller 20 also functions as a combination processing selector. The image combination section 11 functioning as a corrected image data generating section carries out combination processing in accordance with the content of combination processing that was selected by the combination processing selector, to generate dark corrected image data (refer, for example, to S39-S45 in FIG. 3).

Next, an overview of operation of the camera shown in FIG. 1 will be described. On the basis of control by the system controller 20, adjustment of a focus lens constituting the lens 2 is carried out, and an aperture is set to a specified value. Then, on the basis of control by the system controller 20, the mechanical shutter 3 is opened, and an optical image is converted to electrical signals by the image sensor 4. Image data that has been read out from the image sensor 4 is subjected to prescribed image processing in the image processing section 10, and stored in the external memory 36. Also, image data that has been subjected to prescribed image processing by the image processing section 10 is displayed on the display section 37 after being resized.

The system controller 20 carries out timing control, such as receipt of instructions from the user via the input IF 38, commencement of exposure of the image sensor 4, signal readout etc., opening and closing timing control of the mechanical shutter 3, and aperture control and auto focus control of the lens. The system controller 20 also carries out control such as acquiring image data from the image processing section 10 and image display by the display section 37, and saving of image data to the external memory 36. Specifically the system controller 20 functions as an image sensor control section carrying out control to cause operation to read out image data from the image sensor. The system controller 20 also functions as a shutter control section for controlling to cause operation to place the shutter in an exposing state or a light shielding state.

Next, the flow of processing of the camera of this embodiment will be described using the flowcharts shown in FIG. 2 and FIG. 3. These flowcharts are executed by the system controller 20 controlling each section in accordance with programs stored in the internal memory 33.

These flowcharts illustrate a sequence for the case where the user has selected bulb shooting mode using the input IF, and a combination mode has been selected during bulb shooting mode. Whatever the bulb shooting mode, description of normal bulb exposure, where interim display during exposure is not carried out, and additive combination display mode to carry out interim display during exposure as an added image, has been omitted, but description is given for an interim display operation for displaying image data that has been continuously read out after each time of being subjected to comparative combination or averaging combination as interim shooting.

As combination methods there are comparatively bright combination, comparatively dark combination and averaging combination. The combination method can be selected in line with the user's shooting objectives. As internal processing of the camera, two or three from among the comparatively bright combination, comparatively dark combination and averaging combination may be carried out simultaneously in parallel. If comparatively bright combination is set as the combination method, it is possible to adjust the length of light trails in accordance with exposure time, with background brightness fixed regardless of the exposure time. Also, if comparatively dark combination mode is set, light trails that move are removed, leaving only a background image. With averaging combination, random noise included in image output is reduced by averaging processing, which has the effect of improving image quality.

If the flow shown in FIG. 2 is entered, first live view display is carried out (S1). In this step, live view display is carried out on the display section 37, based on image data that has been output from the image sensor 4 at a prescribed frame rate, with the mechanical shutter 3 in a wide-open state. If live view display is carried out, the user confirms the live view image (or subject image using an optical viewfinder), and adjusts camera orientation, lens focal length (zoom) and focus, so as to be able to shoot the subject they want to shoot. Also, as required, the user can carry out setting for interim display mode, comparatively bright combination mode, comparatively dark combination mode, averaging combination mode etc. by means of the input IF section 38, such as operation buttons and a touch panel.

If live view display has been carried out, next processing for the case where a first release has been performed is carried out (S3). Here, the system controller 20 performs determination for a first release switch that is turned on when a release button is pressed down half way, and if it is on carries out AF (automatic focus control) and AE (automatic exposure control). AF is achieving focus by carrying out drive control of a focus lens within the lens 2 so that a contrast signal based on an image signal repeatedly read out from the image sensor becomes a maximum value. Also, AE is automatic control of aperture value, ISO sensitivity, and exposure time T so that output of an image signal that is repeatedly read out from the image sensor becomes a correct exposure. Depending on camera settings, one or both of the AF and AE functions may be turned off, and the user may manually set focus lens position (focus adjustment), aperture value, ISO sensitivity and exposure time T etc. by means of the input IF or the like.

If first release processing has been carried out, it is next determined whether or not a second release is on (S5). If the first release processing is being carried out and the user has decided on shooting composition and focus, next the release button is pressed down fully in order to commence shooting. In this step, it is determined whether or not a 2nd release switch, that is linked to the release button, is on. If the result of this determination is that the second release switch is not on, processing returns to step S1, live view display is repeatedly carried out, and until the second release switch is turned on AF and AE operations are carried out each time the first release switch is on.

If the result of determination in step S5 is that the second release switch is on, then in step S7 bulb shooting is commenced. First, dark image_1 shooting is carried out (S7). Here the system controller 20 closes the mechanical shutter 3 and shoots dark image_1 acquired from the image sensor 4 during exposure time T in a light shielding state.

If shooting of dark image_1 has been carried out, next image data for dark image_1 is saved to internal memory (S9). Here, image data of dark image_1 that was taken in step S7 is read out from the image sensor 4 and saved to the internal memory 33. This saved dark image data is used in FPN processing which will be described later (refer to S25 and S39-S47).

If image data of dark image_1 has been saved to internal memory, next exposure is commenced (S11). Here, the system controller 20 opens the mechanical shutter 3, the image sensor 4 commences exposure of a first frame, and a timer for measuring exposure time is reset and a timer operation is commenced.

Once exposure has commenced, it is next determined whether or not the exposure time T has elapsed (S13). The exposure time T is manually set beforehand by the user, or automatically set by an AE function, and is an image readout period (exposure time) for the image sensor. Regarding the determination processing of this step S13, in the case of shooting the first frame determination is based on elapsed time of the timer whose timer operation was started in step S11. On the other hand, with shooting of the second and subsequent frames, the determination processing of this step S13 is based on elapsed time of a timer whose timer operation was started in step S15, which will be described later. If the result of this determination is that the exposure time T has not elapsed, lapse of the exposure time T is awaited while continuing exposure.

If the result of determination in step S13 is that exposure time T has elapsed, an image signal is read out and exposure is restarted (S15). Here, the system controller 20 reads out the image signal from the image sensor 4, and after completion of image signal readout restarts exposure. In this restart of the exposure, accumulation of the image signal is restarted by electronic shutter control for the image sensor 4 with the mechanical shutter 3 kept open. Also, the timer for keeping time of the exposure time is reset and the timer operation is restarted.

Also, if image signal readout has been carried out in step S15, next that image signal is saved to internal memory (S17). In this step, the image signal that has been read out from the image sensor 4 is stored in the internal memory 33 as digital image data. The next exposure commences immediately after an image signal has been read from the image sensor 4 in steps S15 and S17, and in parallel with this the read out image data is stored in the internal memory 33. It is therefore possible to keep non-exposure periods of consecutively captured associated images to a minimum, and it is possible to minimize light trails in a finally combined image being interrupted. With a CMOS image sensor that is generally used as an image sensor for a digital camera, readout is performed every one line, and it is possible to sequentially control commencement of exposure, which means that a time in which there is no exposure between consecutive frames is only about the readout time for a single line. Since this time is extremely short, in the order of a few tens to 100 µS, it will not appear as an image in which light trails are broken.

If the image signal has been saved to internal memory in step S17, it is next determined whether or not it is processing for the first frame (S19). Since comparative combination processing (comparatively bright combination processing, comparatively dark combination processing) or averaging combination processing are carried out after acquiring image data for the second frame, it is determined in this step whether it is the time of acquisition of image data for the first frame or the time of acquisition of image data for a second or subsequent frame. If the result of determination in step S19 is that it is processing for the first frame, processing advances to step S23 and combination processing is not carried out.

If the result of determination in step S19 is that it is not processing for the first frame (namely that it is processing for a second or subsequent frame), next combination is carried out from a combined image and a read out image (S21). Here, comparatively bright combination processing, comparatively dark combination processing and averaging combination processing (only one may be performed, or two may be performed) is carried out in accordance with the user setting. If it is immediately after image data for the second frame has been read out, image data for the first frame and the second frame are temporarily stored in the internal memory 33.

In a case where comparatively bright combination processing is set, the system controller 20 compares associated pixel outputs for the same addresses of two images using image data readout for the first and second frame that was temporarily stored in the internal memory 33, and selects the larger pixel data as pixel data for an image after combination. Image data that has being combined based on the selected pixel data is then made comparatively bright combination image data (cumulative comparatively bright combination image data).

In a case where comparatively dark combination processing is set, the system controller 20 compares associated pixel outputs for the same addresses of two images, and selects the smaller pixel data as pixel data for an image after combination. Image data that has being combined based on the selected pixel data is then made comparatively dark combination image data (cumulative comparatively dark combination image data).

Further, in a case where averaging combination processing has been set, the system controller 20 makes image data, that is based on pixel data that has been generated by averaging associated pixel outputs of the same addresses of two images, the averaging combination image data (cumulative averaging combination image data).

In the event that in step S21 it is processing for a third or subsequent frame, then similarly, comparatively bright combination processing, comparatively dark combination processing or averaging combination processing are carried out using image data that has been read out from the image sensor 4 and cumulatively combined image data up to now that has been saved in the internal memory 33 (respectively one of cumulative comparatively bright combination image data, cumulative comparatively dark combination image data or cumulative averaging combination image data). Details of the comparative combination processing and averaging processing will be described later.

If the comparative combination processing or averaging combination processing has been carried out in step S21, next saving to internal memory is carried out (S23). Here, in the case of the first frame, an image signal that was read out in step S15 is saved, while in the case of a second or subsequent frame image data of a combined image for which comparative combination processing or averaging combination processing was carried out in step S21 is saved.

Once the data has been saved to the internal memory, FPN processing is carried out (S25). Here, the FPN cancellation processing section 12 calculates respectively corresponding pixel data differences (combined image—dark image_1) for a plurality of pixel data constituting combined image data and a plurality of pixel data constituting dark image_1, using combined image data that is saved in the internal memory 33 and image data of dark image_1 that was acquired in step S9.

Once FPN processing has been carried out, next development processing is carried out (S27). Here, development processing such as demosaicing processing, γ correction processing, noise reduction processing, YC signal generation processing, resizing processing etc. is applied to the image data that was subjected to FPN processing in step S25 (image data of the first frame or image data of a combined image), by the development processing section 13. Resizing processing makes a number of pixels conform to the number of display pixels of the display monitor, since the number of pixels of the image signal that has been read out from the image sensor 4 is larger than the number of display pixels of the display monitor of the display section 37.

Once development processing has been carried out, display of a developed image is next carried out (S31). Here, an image based on image data that was subjected to development processing in step S27 is displayed on the display section 37. In step S13 an image that has been subjected to combination processing is displayed as an exposure timelapse image every time the exposure time T elapses. It is therefore possible for the user to confirm an image as exposure progresses with a long time exposure. When carrying out display of a developed image, RAW image data that has been subjected to FPN processing or development processing image data is saved to the external memory 36 as interim image data.

Once development display has been carried out, it is next detected whether or not the second release is off (S33). In a case where bulb shooting has been completed after bulb shooting has been commenced by the user pressing the release button in step S5, pressing of the release button is released. In this step, therefore, it is determined whether or not the release switch is off. If the result of this determination is that the release switch is not off (when it is on), processing returns to step S13, and if the time T has elapsed since resetting of the timer in step S13 the processing of steps S15-S33 is executed.

If the result of determination in step S33 is that the second release is off, then exposure is completed at the point in time where the release turned off, even if exposure time T has not elapsed. As a result, the cumulatively combined image data that has been saved in the internal memory 33 is processed without carrying out read out of image data from the image sensor. In the event that it has been determined that the second release switch is off, first dark image_2 shooting is carried out (S35). Similarly to the dark image_1, the system controller 20 closes the mechanical shutter 3 and shoots dark image_2 which will be acquired from the image sensor 4 during exposure time T in a light shielding state.

If dark image_2 shooting has been carried out, next image data of the dark image_2 is saved to internal memory (S37). Here, image data of dark image_2 that was taken in step S35 is readout from the image sensor 4 and saved to the internal memory 33. This saved dark image data is used in FPN processing which will be described later (refer to S39-S47).

If the image data of the dark image_2 has been saved to internal memory, it is next determined whether or not a combination method that has been set by the user is comparatively bright combination, comparatively dark combination, or averaging combination (S39). Whether the combination method is comparatively bright combination, comparatively dark combination or averaging combination is set by the user via the input IF 38, and so in this step determination is based on setting state. In a case where all of comparatively bright combination, comparatively dark combination and averaging combination, or two of the three, have been set, different processing is applied for the respective combined images.

If the result of determination in step S39 is that comparatively bright combination has been set, the system controller carries out combination of dark images (S41) by means of comparatively bright combination of the dark image_1 and the dark image_2. Here, the dark image_1 that was taken in step S7 and saved in step S9, and the dark image_2 that was taken in step S35 and saved in step S37, are read out, corresponding associated pixels are compared, and comparatively bright combination for the dark image_1 and the dark image_2 is carried out by adopting the brighter pixels.

If the result of determination in step S39 is that comparatively dark combination has been set, the system controller carries out combination of dark images (43) by means of comparatively dark combination of the dark image_1 and the dark image_2. Here, the dark image_1 that was taken in step S7 and saved in step S9, and the dark image_2 that was taken in step S35 and saved in step S37, are read out, corresponding associated pixels are compared, and comparatively dark combination for the dark image_1 and the dark image_2 is carried out by adopting the darker pixels.

If the result of determination in step S39 is that averaging combination has been set, the system controller carries out combination of dark images (S45) by means of averaging combination of the dark image_1 and the dark image_2. Here, the dark image_1 that was taken in step S7 and saved in step S9, and the dark image_2 that was taken in step S35 and saved in step S37, are read out. An average for corresponding associated pixels of the dark image_1 and the dark image_2 is then calculated, and averaging combination for the dark image_1 and the dark image_2 is carried out by adopting this average value.

If dark image combination has been carried out in steps S41-S45, next FPN processing is carried out by subtracting the dark combined image from a final combined image (S47). In a case where comparatively bright combination has been set, the dark combined image that was generated in step S41 is subtracted from the final combined image that was generated as a result of the comparatively bright combination. Here, the final image that was generated as a result of the comparatively bright combination is achieved by updating image data saved in the internal memory 33 in step S23 by carrying out the comparatively bright combination in step S21 every time image data is read out from the image sensor 4, and so this saved image data is used as the image data of the final combined image.

In a case where comparatively dark combination has been set, the dark combined image that was generated in step S43 is subtracted from the final combined image that was generated as a result of the comparatively dark combination, in step S47. Here, the final image that was generated as a result of the comparatively dark combination is achieved by updating image data saved in the internal memory 33 in step S23 by carrying out the comparatively dark combination in step S21 every time image data is read out from the image sensor 4, and so this saved image data is used as the image data of the final combined image.

Also, in a case where averaging combination has been set, the dark combined image that was generated in step S45 is subtracted from the final combined image that was generated as a result of the averaging combination, in step S47. Here, the final image that was generated as a result of the averaging combination is achieved by updating image data saved in the internal memory 33 in step S23 by carrying out the averaging combination in step S21 every time image data is read out from the image sensor 4, and so this saved image data is used as the image data of the final combined image.

If an FPN processed image has been generated in step S47, this image is next saved to external memory (S49). Here, an image resulting from applying the FPN correction in step S47 to an image that has been combined using the set combination mode is saved to the external memory 36.

If the combined image that has been subjected to FPN processing has been saved to the external memory 36, next image display for the stored image is carried out (S51). Here, an image based on the taken image data that was saved in external memory 36 is displayed on the display section 37. If display of the stored image has been carried out, operation for the comparative combination mode is completed.

Figure 3:
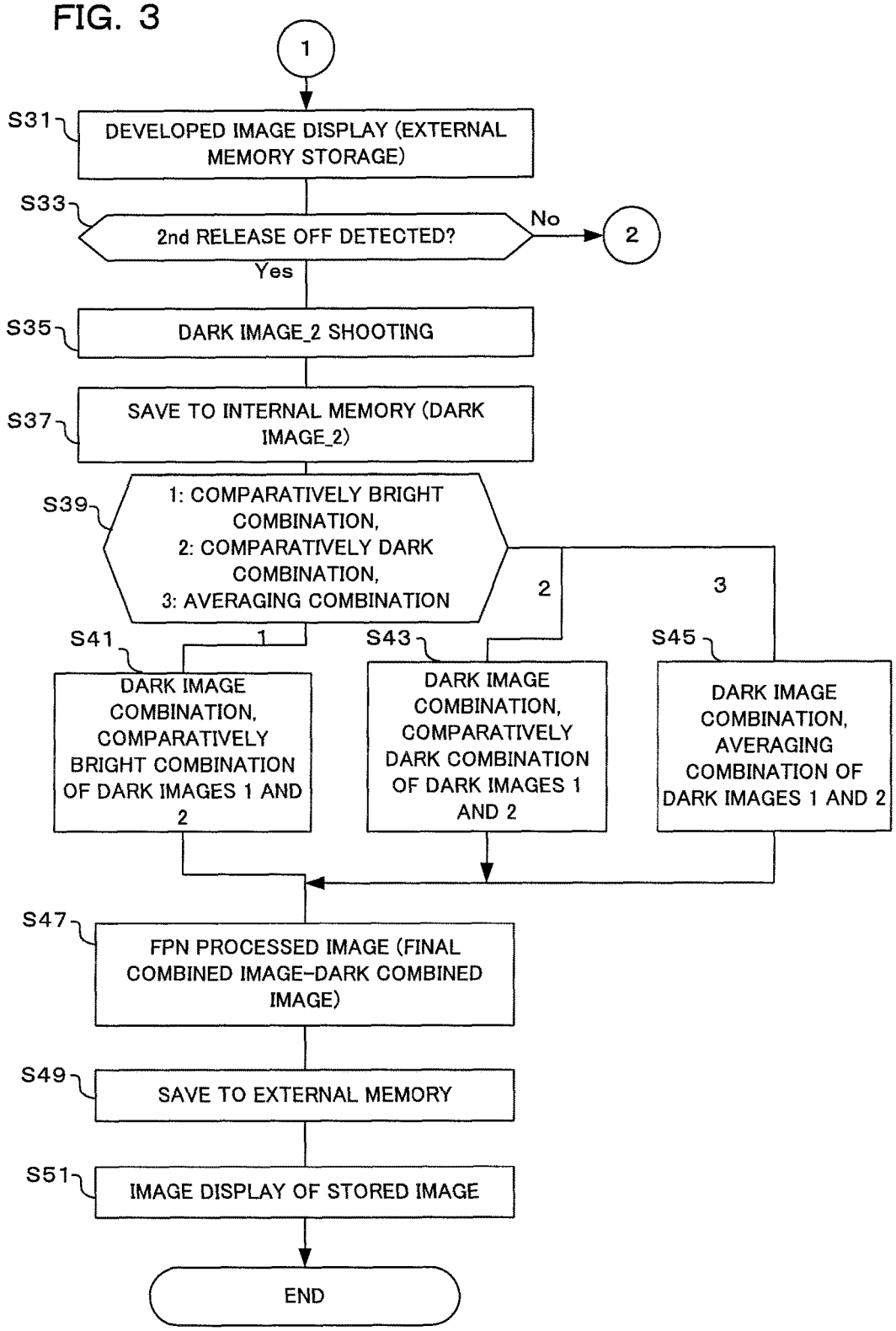
FIG. 3 is a flowchart showing operation when combination mode has been set, in the camera of one embodiment of the present invention.

In this way, in the flowcharts shown in FIG. 2 and FIG. 3, in the case of carrying out comparatively bright combination, fixed pattern noise within cumulative comparatively bright combination image data is corrected using a combined image (dark combined image) resulting from carrying out comparatively bright combination of dark image data (image data of dark image_1) that was acquired before initially acquiring image data, and dark image data (image data of dark image_2) that was acquired after the second release switch was turned off (refer to S41, S47).

Also, in the case of carrying out comparatively dark combination, fixed pattern noise within cumulative comparatively dark combination image data is corrected using a combined image (dark combined image) resulting from carrying out comparatively dark combination of dark image data (image data of dark image_1) that was acquired before initially acquiring image data, and dark image data (image data of dark image_2) that was acquired after the second release switch was turned off (refer to S43, S47).

Also, in the case of carrying out averaging combination, fixed pattern noise within cumulative averaging combination image data is corrected using a combined image (dark combined image) resulting from carrying out averaging combination for dark image data (image data of dark image_1) that was acquired before initially acquiring image data, and dark image data (image data of dark image_2) that was acquired after the second release switch was turned off (refer to S45, S47).

Also, while the operation instruction section is instructing shooting, first image data or second image data is acquired from the imaging device every prescribed time, and cumulatively combined image data is generated every prescribed time period (S21). For the cumulatively combined image data, the correction section (FPN cancellation processing section 12) then corrects fixed pattern noise within the cumulatively combined image data using first dark image data (S25). The display section 37 displays the image data that has been corrected by the correction section as a display image (S31). Since an image that has had fixed pattern noise corrected is displayed as a time-lapse image, image quality of the time-lapse image is improved.

Also, while the operation instruction section is instructing shooting, first image data or second image data is acquired from the imaging device every prescribed time, and cumulatively combined image data is generated every prescribed time period. For the cumulatively combined image data, the correction section (FPN cancellation processing section 12) corrects fixed pattern noise within the cumulatively combined image data using first dark image data (S25). The memory stores image data that has been corrected by the correction section (S31). As a result, it is possible to select a time-lapse image after shooting is completed, and store the selected time-lapse image as a final image.

Next, the comparative combination processing and the averaging combination processing will be described. A two dimensional address of image data is made (x, y), and an image read out for an Nth frame (N is an integer) is made N(x, y). If a combined image up to an N−1th image is made N−1_com(x, y), then an Nth combined image N_com(x, y) is formed by comparing or averaging output data for addresses (x, y) for N(x, y) and N−1_com(x, y). x is in a range of 1~the number of pixels of the image sensor in an x direction, and y is in a range of 1~number of pixels in a y direction.

With comparatively bright combination at this time, pixel outputs N(x, y) and N−1_com(x, y) for the same address are compared, and the larger is selected. The selected pixel output is then made pixel output for combined image N_com(x, y). In the event that the two pixel outputs are equal in size, that value is reflected.

With comparatively dark combination at this time, pixel outputs N(x, y) and N−1_com(x, y) for the same address are compared, and the smaller is selected. The selected pixel output is then made pixel output for combined image N_com(x, y). In the event that the two pixel outputs are equal in size, that value is reflected.

Also, with averaging combination, pixels outputs N(x, y) and N−1_com(x, y) for the same address are averaged. This average value is then made pixel output for combined image N_com(x, y). In the event that the two pixel outputs are equal in size, that value is reflected.

Figure 4:
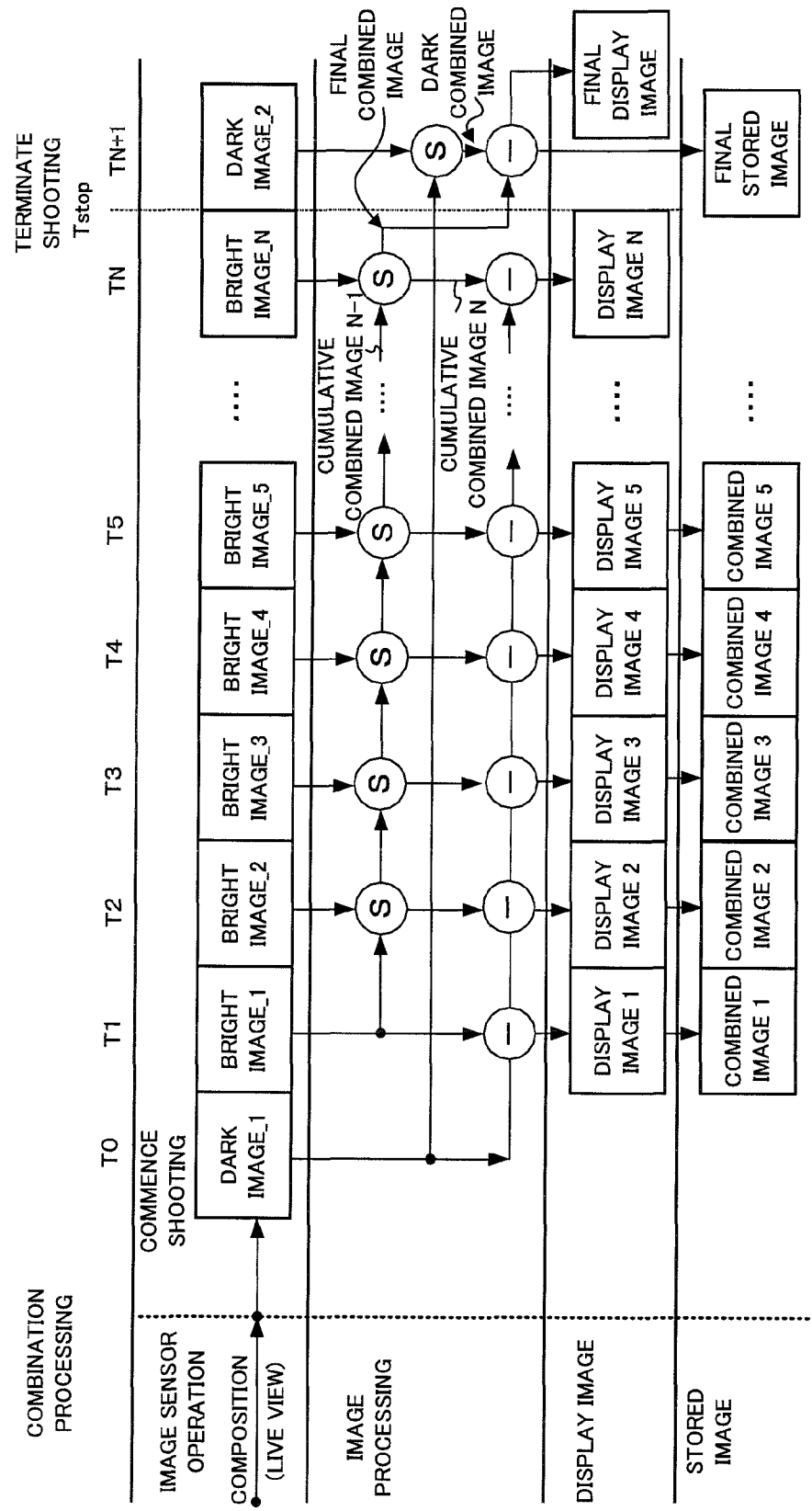
FIG. 4 is a timing chart showing operation at the time of bright combination processing, in the camera of one embodiment of the present invention.
Figure 8C:
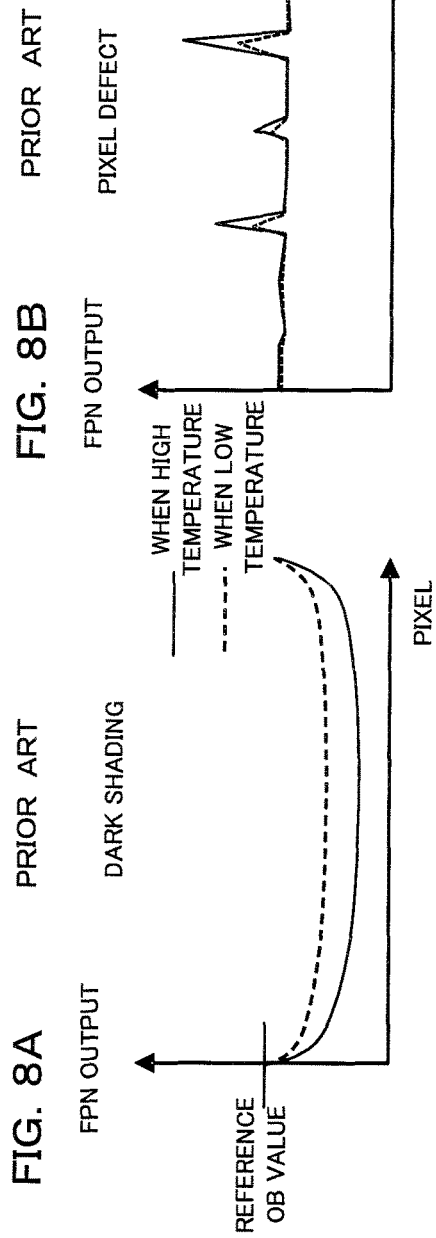

Next, combination processing will be described using FIG. 4. In FIG. 4, the upper stage shows operation of the image sensor, while the next stage shows change over time of combination processing. In these sections "S" represents comparative combination processing or averaging processing, and "-" represents FPN cancellation processing. The stage after image processing represents change over time of a display image, and the stage after display image represents change over time of a stored image.

In FIG. 4, if shooting is commenced, dark image_1 is acquired (T0, S7 in FIG. 2), and then bright image_1 is acquired (T1, S15 in FIG. 2). Here, bright image_1 is saved to the internal memory 33 as a cumulative combined image. FPN processing is carried out using image data of bright image_1 and dark image_1 (S25 in FIG. 2), and display image 1 is displayed based on image data that has been subjected to FPN processing and saved to the external memory 36 as combined image_1 (S31 in FIG. 3).

If bright image_2 is then acquired (T2, S15 in FIG. 2), it is combined with the cumulative combined image (bright image_1) saved in the internal memory 33. The combined image is saved to the internal memory 33 as a cumulative combined image. The cumulative combined image is subjected to FPN processing using dark image_1 (S25 in FIG. 2), and display image 2 is displayed based on image data that has been subjected to FPN processing. Also, the cumulative combined image after the FPN processing has been performed is saved to the external memory 36 as combined image 2 (S31 in FIG. 3). If FPN processing for every frame has been carried out and then the cumulative combined image is combined, random noise included in dark image_1 is superimposed on the cumulative combined image, and image quality deteriorates. With this embodiment, therefore, an image before FPN processing is saved to the internal memory 33 as a cumulative combined image. By performing the processing of step S25 and step S31, it is possible to minimize the number of times that FPN processing is performed and improve image quality. Saving of the combined image to the external memory 36 is carried out in a case where setting has been performed by the user via the input IF 38, when the photographer wants to save interim images during shooting.

After that, the same processing is performed every time a bright image is acquired (T2, T3, . . . TN). In this state, a display image N, which is an image resulting from applying FPN processing using dark image_1 to the cumulative combined image_N obtained by combining bright image_N that was acquired at the time TN with a cumulative combined image that was subjected to cumulative combination processing from T0 to TN, is output to the display section 37.

After the Nth bright image has been acquired (TN), in the event that a state where the second release switch is off due to a release operation by the photographer has been detected, shooting is completed (Tstop). With the $(TN+1)^{th}$ exposure at this time, since shooting is completed with exposure in an interim state, readout of image data from the image sensor 4 is not carried out. Instead, the finally acquired bright image_N and cumulative combined image are combined, and saved to the internal memory 33 as a final combined image. Next, dark image_2 is taken with the mechanical shutter 3 in a light shielding state (TN+1, S35 in FIG. 3), and a dark combined image that is dark image_1 and dark image_2 combined (S41 to S45 in FIG. 3) is generated. The final combined image is then subjected to FPN processing with this dark combined image (S47 in FIG. 3). After that, a final display image is displayed on the display section 37 based on the image that has been subjected to FPN processing. On the other hand, the same FPN processed image is stored as a final stored image (S49, S51 in FIG. 3). Here, FPN processing is carried out using a dark combined image that has been combined using the same combination method (comparatively bright combination, comparatively dark combination, averaging combination) as for the bright image.

Next, fixed pattern noise (FPN) that arises in an image at the time of actual shooting will be described using FIGS. 5A and 5B. In a case where exposure time is the same, as temperature of the image sensor 4 at the time of shooting increases, FPN becomes larger. Defects and dark shading exist as FPN, and defects become increased in output as temperature rises, while dark shading is irregular such that output may be large or may be small depending on the image sensor 4, and there may be no variation with temperature.

The example shown in FIG. 5A shows variation in temperature over time in a case where temperature of the image sensor 4 is falling during shooting. With this example, temperature of the image sensor 4 is raised substantially during a live view operation accompanying high speed read out processing, image processing and display processing. If shooting is commenced after the temperature of the image sensor 4 has risen substantially, since read out processing from the image sensor 4, image processing and display processing are carried out at a slower frame rate than for live view in period T, temperature of the image sensor 4 gradually falls from commencement of shooting.

On the other hand, the example shown in FIG. 5B shows variation in temperature over time in a case where temperature of the image sensor 4 is rising during shooting. This example applies in situations such as when shooting immediately after turning the camera power supply on, when processing is made faster with a cycle of the exposure time T at a faster frame rate than for live view, when heat dissipation of the camera itself is low, etc. In this case temperature of the image sensor gradually rises from commencement of shooting.

Both when the temperature of the image sensor 4 rises and when the temperature falls, as long as there is not abrupt variation in the temperature of the external environment, temperature of the image sensor 4 will be maximum or minimum at the time of either the commencement or completion of shooting. With this embodiment therefore, FPN processing is carried out using two dark images that were acquired at the time of commencement and completion of shooting.

Next, distribution of fixed pattern noise (FPN) within the image sensor 4 will be described using FIG. 6A and FIG. 7A.

FIG. 6A and FIG. 7A schematically show FPN output variation for every pixel position of the image sensor 4. FIG. 6A shows a case where as temperature increases FPN output based on pixel defect becomes large, while FPN output based on dark shading becomes small. With this example, a solid line shows FPN output at the time of high temperature, while the dotted line shows FPN output at the time of low temperature. With this example, FPN output based on shading becomes small in the vicinity of the center of the image sensor 4, with FPN output becoming larger towards the periphery. Also, FPN output based on pixel defect becomes large at pixel positions L1, L2 and L3.

Also, the image sensor 4 shown in FIG. 7A represents the case where FPN output based on pixel defect becomes larger as temperature increases (this point is the same as for the case in FIG. 6A), and FPN output based on dark shading becomes large. With this example also, a solid lines shows FPN output at the time of high temperature, while the dotted line shows FPN output at the time of low temperature. With this example, FPN output based on shading becomes large in the vicinity of the center of the image sensor 4, with FPN output becoming smaller towards the periphery. Also, FPN output based on pixel defect becomes large at pixel positions L11, L12 and L13. With the example of FIG. 7A, the direction of temperature variation for dark shading is opposite to that of the case shown in FIG. 6A.

Next, elimination of a fixed pattern noise (FPN) using FPN processing will be described for every combination processing.

First, description will be given for the case where comparatively bright combination is carried out as the combination processing. With comparatively bright combination, output of pixels whose pixel output is comparatively larger as a result of a bright combination processing is reflected as pixel output in a resulting combined image. This means that in a case where exposure (subject brightness) of associated images that are being combined is the same, FPN of a bright image having largest FPN (large noise) will be reflected in a finally combined pixel. Specifically, if bright image_N is subjected to comparatively bright combination from bright image_1, for pixel defects FPN (fixed pattern noise) of a bright image at the highest temperature will be reflected in a combined image, and for dark shading FPN of a bright image that was taken when temperature was at its highest or lowest value is reflected in the combined image. Whether reflection of dark shading will be that at a high temperature or that at a low temperature is dependent on a shading characteristic of the image sensor. Since temperature of the image sensor is maximum or minimum at either the commencement or completion of shooting, FPN (defects, dark shading) that is largest of that in a bright image that is initially taken or that is finally taken will be reflected in the final combined image.

Accordingly, by performing comparatively bright combination for dark image_1, that has been taken at substantially the same temperature as a bright image that was initially taken, and dark image_2, that was taken at substantially the same temperature as a bright image that was finally taken, defects and dark shading of which output are respectively large are reflected in the dark combined image similarly to the final combined image, and so it is possible to optimally correct FPN (refer to the thick line in FIG. 6B and FIG. 7B).

On the other hand, with comparatively dark combination output of pixels whose pixel output is small constitutes a dark combination processing result, and this is reflected as pixel output, and so in a case where exposure (subject brightness) of associated images that are being combined is the same, FPN of a bright image having smallest FPN (small noise) will be reflected in a finally combined image. Specifically, if bright image_N is subjected to comparatively dark combination from bright image_1, for pixel defects FPN (fixed pattern noise) of a bright image at the lowest temperature will be reflected in a combined image, and for dark shading FPN of a bright image that was taken when temperature was at its highest or lowest value is reflected in the combined image. Whether reflection of dark shading will be that at a high temperature or that at a low temperature is dependent on a shading characteristic of the image sensor. Since temperature of the image sensor is maximum or minimum at either the commencement or completion of shooting, FPN (defects, dark shading) that is smallest of that in a bright image that is initially taken or that is finally taken will be reflected in the final combined pixel.

Accordingly, by performing comparatively dark combination for dark image_1, that has been taken at substantially the same temperature as a bright image that was initially taken, and dark image_2, that was taken at substantially the same temperature as a bright image that was finally taken, defects and dark shading that are respectively small are reflected in the dark combined image that is the same as the final combined image, and so it is possible to optimally correct FPN (refer to the thick line in FIG. 6C and FIG. 7C).

Also, with averaging combination, pixel outputs that have been subjected to averaging processing are reflected as pixel output. This means that in a case where exposure (subject brightness) of associated images that are being subjected to averaging combination is the same, an average value of FPN contained in each bright image will be reflected in a finally combined pixel. Specifically, if averaging combination is carried out for bright image_N from bright image_1, for defects and dark shading an average value of FPN for bright images of N frames is reflected in the combined image. If the case is assumed where temperature of the image sensor 4 is maximum or minimum at the time of either commencement or completion of shooting, it is possible to more effectively correct FPN with a dark combined image that results from averaging combination of dark image_1 and dark image_2 contains FPN that is most similar to that of the final combined image, compared to FPN cancellation with only either one of dark image_1 or dark image_2.

As has been described above, with the one embodiment of the present invention, when carrying out a long time exposure, such as bulb shooting, before acquiring a bright image by opening the shutter, a dark image_1 is acquired with the shutter in a light shielding state. Also, after completion of a long time exposure, dark image_2 is acquired with the shutter in a light shielding state. Then, in the case of carrying out comparatively bright combination processing as combination processing, FPN processing is carried out using an image generated by performing comparatively bright combination on dark image_1 and dark image_2. On the other hand, in the case of carrying out comparatively dark combination processing as combination processing, FPN processing is carried out using an image generated by performing comparatively dark combination on dark image_1 and dark image_2. Also, in the case of carrying out averaging combination processing as combination processing, FPN processing is carried out using an image generated by performing averaging combination on dark image_1 and dark image_2. As a result, it is possible to carry out correction so that a corrective effect for FPN cancellation is high, and it is possible to improve image quality.

Also, with a camera (imaging device) of the one embodiment of the present invention, a correction section (for example, the FPN cancellation processing section 12) corrects fixed pattern noise within cumulative comparatively combined image data using dark image data (dark image_1) that has been acquired before acquiring first image data (S25 in FIG. 2). The imaging device then displays an image represented by cumulative comparatively combined image data or cumulative averaging combination image data that has had fixed pattern noise corrected (S31 in FIG. 3. This means that even when carrying out live view display with images while combination is in progress as sequential interim exposures, or when saving images while combination is in progress as interim time-lapse images, it is possible to correct fixed pattern noise of a live view image and of a time-lapse image. Specifically, it is also possible to improve image quality for live view display and for interim and stored images, by also carrying out FPN cancellation for images while combination is in progress using a dark image that has been acquired before bright image shooting.

With the one embodiment of the present invention, shooting is commenced as a result of pressing the release button, and shooting is stopped by releasing the pressing of the release button. However, this is not limiting and it is also possible to commence shooting as a result of pressing the release button and to continue shooting even if the pressing of the release button is temporary released after commencement of shooting, and to stop shooting when the release button is pressed again.

Also, with the one embodiment of the present invention, it is possible to set three types of combination processing, namely comparatively bright combination, comparatively dark combination and averaging combination. However, the type of combination processing is not limited, and it is possible to have only one or two of these types of combination processing. Further it is possible to have only comparatively bright processing, only comparatively dark processing, or averaging for interim display at the time of bulb shooting, and to simply display an added image.

Also, with the one embodiment of the present invention, a combined image is stored in the external memory 36 every time an image is read out from the image sensor 4 (S31 in FIG. 3). However, this is not limiting, and an image may only be stored to the internal memory 33. In this case, it is not possible to confirm a time-lapse image after completion of shooting.

Further, with the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any event, it is possible to adopt the present invention as long as a device is capable of shooting long time exposures.

Also, with the one embodiment of the present invention, description has been given for an example where the present invention is applied to a device for taking pictures. However, this is not limiting, and the present invention may be applied to an imaging device that acquires image data for a plurality of bright images from commencement until completion of shooting, and acquires image data of dark images before and after shooting, and subjects this plurality of image data to the image processing as shown in FIG. 2 and FIG. 3.

Also, with the one embodiment of the present invention, the image processing section 10 is constituted by hardware that is separate to the system controller 20, but all or some sections may be constituted by software, and executed using a microcomputer within the control section 10.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
a shutter that is put into a light shielding state or an exposed state of blocking or passing, respectively, a light beam that is incident on an imaging surface of an image sensor;
a first memory that stores first image data that has initially been generated based on image data that has been read out from the image sensor, as cumulatively combined image data;
an image combination section that sequentially and repeatedly performs combination processing to reconstruct the cumulatively combined image data by making pixel data, that is a result of comparing a plurality of pixel data constituting second image data that has been generated based on image data that has been read out from the image sensor after the first image data, with pixel data respectively corresponding to the plurality of pixel data constituting the cumulatively combined image data, new pixel data, and stores the cumulatively combined image data after the reconstruction in the first memory, to be used as the second image data of the second and subsequent frames;
a correction section that performs image correction for the cumulatively combined image data; and
a controller for
(1) controlling operation to read out image data from the image sensor,
(2) controlling to cause operation of the shutter to the exposed state or the light shielding state, and
(3) carrying out control to acquire first dark image data before acquiring the first image data by placing the shutter in a light shielding state for a light beam that is incident on the imaging surface of the image sensor, and causing a shooting operation of the image sensor in the light shielding state, and to further acquire second dark image data by, after the second image data has been finally acquired, placing the shutter in a light shielding state for the light beam that is incident on the imaging surface of the image sensor, and causing a shooting operation of the image sensor in the light shielding state,
wherein the image combination section is provided with a corrected image data generating section for generating dark corrected image data by carrying out combination processing based on a comparison result of comparing the first and second dark image data, and wherein the correction section performs image correction to correct fixed pattern noise within the cumulatively combined image data using the dark corrected image data.

2. The imaging device of claim 1, wherein:
the combination processing by the image combination section includes at least one of (A) comparatively bright combination processing, and (B) comparatively dark combination processing,
and the corrected image data generating section
generates the dark corrected image data by carrying out combination processing using comparatively bright combination processing on the first dark image data and the second dark image data in a case where the combination processing is comparatively bright combination processing, and
generates the dark corrected image data by carrying out combination processing using comparatively dark combination processing on the first dark image data and the second dark image data in a case where the combination processing is comparatively dark combination processing.

3. The imaging device of claim 1, wherein:
the controller further comprises a combination processing selector that selects combination processing content for carrying out the combination processing, and
the corrected image data generating section carries out combination processing in accordance with the content of combination processing that was selected by the combination processing select section, to generate dark corrected image data.

4. The imaging device of claim 1, further comprising:
an operation instruction section for operation instruction of commencement and completion of shooting for the imaging device, and
a display section for display output of a display image, wherein
while the operation instruction section is instructing shooting, the controller acquires the first image data or the second image data from the imaging device every prescribed time, and the image combination processing section generates the cumulatively combined image data every prescribed time period based on the first image data or the second image data,
the correction section corrects fixed pattern noise of the cumulatively combined image data using the first dark image data, and
the display section outputs the image data that has been corrected by the correction section for displaying as the display image.

5. The imaging device of claim 1, further comprising:
an operation instruction section for operation instruction of commencement and completion of shooting for the imaging device, and
a second memory for storing the cumulatively combined image data after having been corrected by the correction section,
wherein
while the operation instruction section is instructing shooting, the controller acquires the first image data or the second image data from the imaging device every prescribed time, and the image combination processing section generates the cumulatively combined image data every prescribed time period based on the first image data or the second image data, the correction section corrects fixed pattern noise within the cumulatively combined image data using the first dark image data, the second memory stores image data that has been corrected by the correction section, and after the operation instruction section has instructed shooting completion, the correction section corrects fixed pattern noise of the cumulatively combined image data using dark corrected image data that has been generated by the corrected image generating section, and the second memory stores image data that has been corrected by the correction section.

6. An image processing device, for generating cumulatively combined image data by carrying out image combination processing using first and second dark image data that have been read out from an image sensor in a light shielding state before and after imaging by the imaging device, and a plurality of image data that have been repeatedly read out during shooting by the imaging device, the image processing device comprising:

a first memory for storing first image data that has initially been generated based on image data that has been read out from the image sensor, among the plurality of image data, as cumulatively combined image data;

an image combination processing section for sequentially repeating combination processing to reconstruct the cumulatively combined image data by making pixel data, that has been subjected to combination processing based on a comparison result of comparing a plurality of pixel data constituting second image data that has been generated based on image data that has been read out from the image sensor with pixel data respectively corresponding to a plurality of pixel data constituting the cumulatively combined image data, new pixel data, and storing the cumulatively combined image data after the reconstruction in the first memory, for the second image data of second and subsequent frames; and a correction section that performs correction for the cumulatively combined image data, wherein the image combination processing section is provided with a corrected image data generating section for generating dark corrected image data by carrying out combination processing based on a comparison result of comparing the first and second dark image data, and wherein the correction section corrects fixed pattern noise within the cumulatively combined image data using the dark corrected image data.

7. The image processing device of claim 6 wherein while an operation instruction section is instructing bulb shooting, the image combination correction section acquires the first image data or the second image data from the imaging device every prescribed time, and the image combination processing section generates the cumulatively combined image data every prescribed time period based on the first image data or the second image data, and the correction section corrects fixed pattern noise of the cumulatively combined image data every prescribed time period using only the first dark image data.

8. The imaging processing device of claim 7, wherein the corrected cumulatively combined image data is displayed by a display device every prescribed time period during the bulb shooting.

9. An imaging method, in an imaging device, comprising:

storing first image data that has been initially formed based on image data that has been read out from an image sensor as cumulatively combined image data;

sequentially repeating combination processing to reconstruct the cumulatively combined image data by making pixel data, that is a result of having compared a plurality of pixel data constituting second image data that has been generated based on image data that has been read out from the image sensor after the first image data, with pixel data respectively corresponding to a plurality of pixel data constituting the cumulatively combined image data, new pixel data, for the second image data of second and subsequent frames that have been generated based on image data that has been read out from the image sensor;

acquiring first dark image data acquired by shooting in a state where a light beam incident on the imaging surface of the image sensor is shielded, before forming the first image data, and acquiring second dark image data acquired in a state where a light beam incident on the imaging surface of the image sensor is shielded, after the second image data that was finally generated;

generating dark corrected image data by carrying out combination processing based on a comparison result of comparing the first and second dark image data; and correcting fixed pattern noise within the cumulatively combined image data using the dark corrected image data.

10. The imaging method of claim 9, further comprising:

while an operation instruction section is instructing bulb shooting, acquiring the first image data or the second image data from the imaging device every prescribed time, and generating the cumulatively combined image data every prescribed time period based on the first image data or the second image data; and correcting fixed pattern noise of the cumulatively combined image data every prescribed time period using only the first dark image data.

11. The imaging method of claim 10, further comprising:

displaying the corrected cumulatively combined image data every prescribed time period during the bulb shooting.

12. A non-transitory computer-readable medium storing a computer program for controlling a computer within an image processing device, the computer program comprising:

storing first image data, that has initially been generated based on image data that has been read out from an image sensor as cumulatively combined image data;

sequentially repeating combination processing to reconstruct the cumulatively combined image data by making pixel data, that is a result of having compared a plurality of pixel data constituting second image data that has been generated based on image data that has been read out from the image sensor after the first image data, with pixel data respectively corresponding to a plurality of pixel data constituting the cumulatively combined image data, new pixel data, for the second image data of second and subsequent frames that have been generated based on image data that has been read out from the image sensor;

acquiring first dark image data acquired by shooting in a state where a light beam incident on the imaging surface of the image sensor is shielded, before forming the first image data, and acquiring second dark image data acquired in a state where a light beam incident on the imaging surface of the image sensor is shielded, after the second image data that was finally generated;

generating dark corrected image data by carrying out combination processing based on a comparison result of comparing the first and second dark image data; and correcting fixed pattern noise within the cumulatively combined image data using the dark corrected image data.

13. The non-transitory computer-readable medium of claim 12 wherein the program further comprises:

while an operation instruction section is instructing bulb shooting, acquiring the first image data or the second image data from the imaging device every prescribed time, and generating the cumulatively combined image data every prescribed time period based on the first image data or the second image data; and correcting fixed pattern noise of the cumulatively combined image data every prescribed time period using only the first dark image data.

14. The non-transitory computer-readable medium of claim 12 wherein the program further comprises:

displaying the corrected cumulatively combined image data every prescribed time period during the bulb shooting.

\* \* \* \* \*